United States Patent [19]

Yoneda et al.

[11] Patent Number: 4,912,450

[45] Date of Patent: Mar. 27, 1990

[54] THERMISTOR AND METHOD OF PRODUCING THE SAME

[75] Inventors: Yasunobu Yoneda; Michihiro Murata; Harufumi Mandai; Yukio Sakabe; Yukio Banba, all of Kyoto, Japan

[73] Assignee: Murata Manufacturing Co., Ltd., Nagaokakyo, Japan

[21] Appl. No.: 237,033

[22] Filed: Aug. 25, 1988

Related U.S. Application Data

[63] Continuation of Ser. No. 100,861, Sep. 25, 1987, Pat. No. 4,786,888.

[30] Foreign Application Priority Data

| | | | |
|---|---|---|---|
| Sep. 20, 1986 | [JP] | Japan | 61-222958 |
| May 13, 1987 | [JP] | Japan | 62-116594 |
| Jun. 23, 1987 | [JP] | Japan | 62-157119 |

[51] Int. Cl.$^4$ .......... H01C 7/10; H01C 1/03; C04B 33/34

[52] U.S. Cl. .......... 338/22 R; 29/616; 264/61

[58] Field of Search .......... 29/612; 338/22 R, 22 SD; 374/183, 185; 264/61

[56] References Cited

U.S. PATENT DOCUMENTS

| | | | |
|---|---|---|---|
| 3,493,913 | 2/1970 | Wagner et al. | 338/22 R |
| 3,634,840 | 1/1972 | Wilkinson | 338/22 R X |
| 4,395,623 | 7/1983 | Shimada et al. | 338/22 SD X |
| 4,431,983 | 2/1984 | Rodriquez | 338/22 R X |
| 4,445,026 | 4/1984 | Walker | 338/22 RR |
| 4,550,301 | 10/1985 | McTavish et al. | 338/20 |

FOREIGN PATENT DOCUMENTS 52-7535 3/1977 Japan .

*Primary Examiner*—Teresa J. Walberg
*Assistant Examiner*—M. M. Lateef
*Attorney, Agent, or Firm*—Armstrong, Nikaido, Marmelstein, Kubovcik & Murray

[57] ABSTRACT

A method for producing negative temperature coefficient thermistor units, comprising the steps of forming a pair of green sheets of insulating ceramic material, stacking the green sheets interposing therebetween in predetermined areas a layer of paste for thermistor elements; providing for each thermistor unit a coating of paste to be formed into internal electrodes; cutting the stacked sheets into individual thermistor units; cofiring the thermistor units whereby the thermistor element is enclosed in an envelope of sintered ceramic material or sandwiched between two layers of sintered ceramic material. A pair of external electrodes is then provided on each thermistor unit.

7 Claims, 5 Drawing Sheets

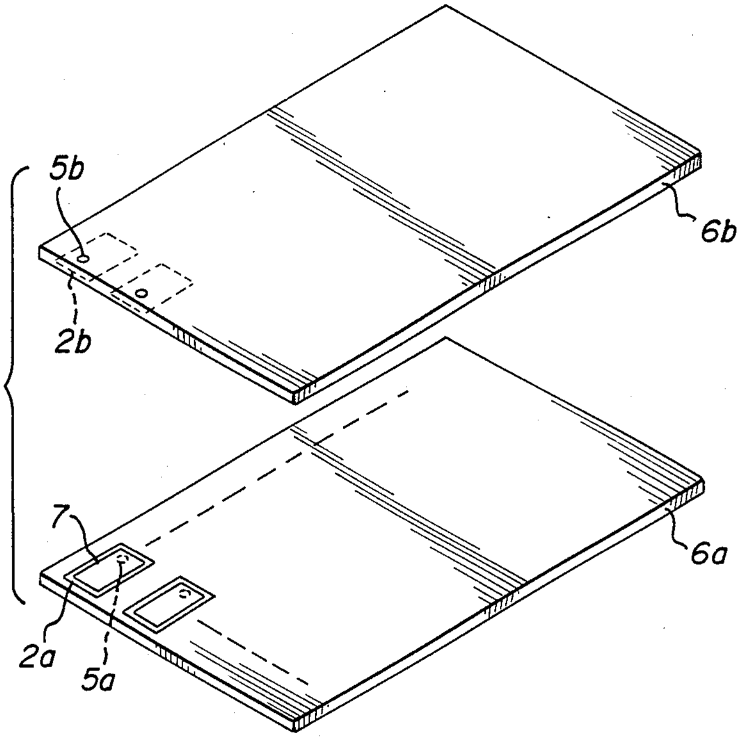
FIG. 3
FIG. 4A
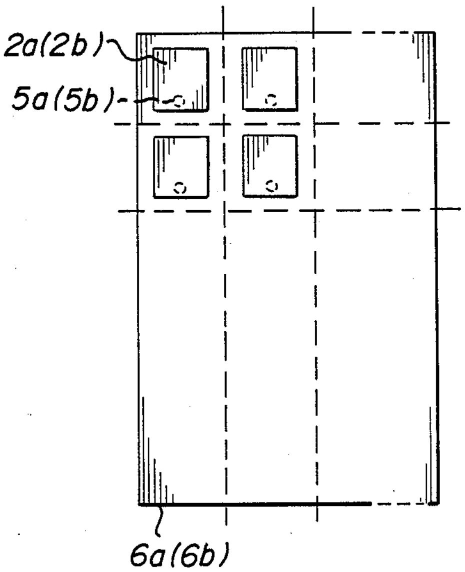
FIG. 4B
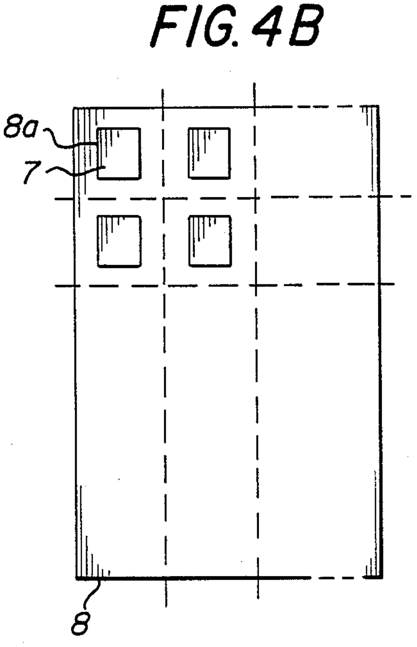

THERMISTOR AND METHOD OF PRODUCING THE SAME

This is a division of application Ser. No. 100,861 filed Sept. 25, 1987 now U.S. Pat. No. 4,786,888.

BACKGROUND OF THE INVENTION (1) Field of the Invention

The present invention relates to a negative temperature coefficient thermistor for use mainly in measuring temperature of compensating for thermal characteristics of other electronic elements or circuits and to a method of producing the same.

(2) Description of the Prior Art

Negative temperature coefficient thermistors are known, and reference may be made, for example, to Japanese Patent Publication No. 52-7535. The document discloses a thermistor having such a construction that a thermistor element produced through sintering a powdered material of ceramic in the form of a chip is sandwiched by a pair of electrodes and enclosed in an envelope made of glass. In this regard, the glass envelope operates to secure or stabilize the thermal and chemical properties of the thermistor element when the thermistor is used for measuring temperature.

A thermistor of the above type, however, has a drawback of requiring relatively complicated production processes because it necessitates the formation of the glass envelope other than that of the thermistor element. In addition, the thermistor element necessitates lead wires to be connected to external devices, which means that it is quite difficult to directly mount the thermistor onto a printed circuit board.

Furthermore, the glass envelope for enclosing the thermistor element has its melting point at about 400° C., therefore, the thermistor is not usable for measuring a temperature at about 1000° C.

SUMMARY OF THE INVENTION

Accordingly, it is a primary object of the present invention to provide a thermistor being stable in operation at a relatively higher temperature.

Another object of the present invention is to provide a thermistor of the above type having easy production steps which has an envelope for enclosing the thermistor element.

Another object of the present invention is to provide a thermistor of the above type suitable for being directly mounted on a printed circuit board.

Another object of the present invention is to provide a higher quality thermistor capable of preventing diffusion of the ingredients contained in the materials of the thermistor in the production process thereof.

Yet another object of the present invetion is to provide a method of producing thermistors of the above type.

In order to achieve the above objects, a negative temperature coefficient thermistor in accordance with a preferred embodiment of the present invention comprises (1) at least one thermistor element layer formed with a pair of internal electrodes provided on both sides thereof, (2) an insulating ceramic envelope for enclosing the thermistor element layer to be integrated therewith through sintering, (3) and a pair of external electrodes provided on the exterior surface of the insulating ceramic envelope as being electrically connected to corresponding ones of the internal electrodes. Specifically, the insulating ceramic envelope is made of an oxide ceramic material. Further the internal electrodes are made of a metal material having a high melting point. Furthermore, the external electrodes are made of platinum.

In a preferred form, the external electrodes are formed on the exterior surface of the insulating ceramic envelope having a parallel relation with corresponding internal electrodes. In this place, the external electrodes are electrically connected to the corresponding internal electrodes by means of an electrically conductive material filled up in a pair of through holes formed in the insulating ceramic envelope between external electrodes and internal electrodes. Specifically the internal electrodes are formed along the interior surface of the insulating ceramic envelope having such a relation that opposite ends of the internal electrodes extend in the opposite directions to be connected to corresponding ones of the external electrodes formed on the side of sintered thermistor body. In a modification, the thermistor has a pair of diffusion preventing layers interposed between the thermistor element layer and the insulating ceramic envelope. The diffusion preventing layers make it possible to prevent the diffusion of the ingredients contained in the thermistor element layer and the insulating ceramic envelope toward each other.

The above objects are achieved by providing a method of producing a negative temperature coefficient thermistor comprising the steps of: forming a pair of green sheets including an insulating ceramic material; coating predetermined areas on one surface of each of the green sheets with paste to be formed into internal electrodes; stacking the green sheets interposing therebetween paste layer to be the thermistor element layer; cutting the stacked sheet into independent thermistor units; firing the thermistor units to be sintered; and forming a pair of external electrodes to be electrically connected to corresponding ones of the internal electrodes on each of the thermistor unit. Specifically, said producing method further comprises the step of forming a pair of through holes to be filled up with the same electrically conductive material as the external electrodes in forming the green sheets of the insulating ceramic layer. Further, said producing method further comprises the step of forming a pair of through holes to be filled up with the same electrically conductive material as the external electrodes in the step of stacking the green sheets of the insulating ceramic material interposing the paste layer to be the thermistor element layer.

The above objects are otherwise achieved by providing a method of producing a negative temperature coefficient thermistor comprising the steps of: forming a pair of first green sheets of an insulating ceramic material; preparing a second green sheet of an insulating ceramic material formed with a number of openings arranged at predetermined portions thereof: filling up each of the openings with paste to be a thermistor element; stacking the first green sheets interposing therebetween the second green sheet provided with the paste to be the thermistor element layer; cutting the stacked sheet into independent thermistor units so that each of the thermistor units comprises one thermistor element layer; firing the thermistor units to be sintered; and forming on each of the thermistor units a pair of external electrodes to be electrically connected to corresponding ones of the internal electrodes.

The above objects are otherwise achieved by providing a method of producing a negative temperature coefficient thermistor comprising the steps of: forming a pair of green sheets of an insulating ceramic material; coating predetermined areas of the green sheets with paste to be formed into internal electrodes; stacking the green sheets interposing therebetween paste to be a thermistor element layer; cutting the stacked sheet into independent thermistor units to be arranged so that the internal electrodes extend to the edges thereof; coating both ends of each of the thermistor units with paste to be external electrodes; and firing the thermistor units to be sintered.

The above objects are otherwise achieved by providing a method of producing a negative temperature coefficient thermistor comprising the steps of: forming a pair of green sheets of an insulating ceramic material; coating predetermined areas of the green sheets with paste to be diffusion preventing layers; coating the paste layer of the diffusion preventing layer with paste to be internal electrodes; stacking the green sheets interposing therebetween paste to be a thermistor element layer; cutting the stacked sheet into independent thermistor units each comprising one thermistor element layer; firing the thermistor units to be sintered; and forming a pair of external electrodes to be connected to corresponding ones of the internal electrodes.

In accordance with the present invention, the thermistor element and the insulating ceramic envelope are coupled together before being co-fired and then sintered to be formed into an integrated body. Accordingly, the resulting thermistor unit requires only the formation of the external electrodes thereon to obtain efficient monolithic thermistor. Thus obtained thermistor can be produced through minimum steps of production processes.

Furthermore, since the insulating ceramic envelope has high melting point and chemical stability, the thermistor element enclosed in the insulating ceramic envelope is made capable of being used at an elevated temperature or under severe conditions.

The external electrodes are provided on the exterior surface of the insulating ceramic envelope having an electrical connection with the internal electrodes, whereby thus obtained thermistor can be mounted on a printed circuit board directly. This construction is highly appreciable when the internal electrodes extend along the interior surface of the insulating ceramic envelope in the opposite directions to be electrically connected to the external electrodes.

The diffusion preventing layer between the thermistor element and the insulating ceramic envelope effectively prevents diffusion of the ingredients contained in the thermistor element and the insulating ceramic envelope toward each other in the production processes of the thermistor. Eventually, this construction ensures smaller variance of the resistance and the thermistor constant of the resulting thermistor as well as the standardization of the characteristics of the thermistors produced at the same time. This enables higher yield rate of the thermistors, which leads to reduction of the production cost of the thermistors.

BRIEF DESCRIPTION OF THE DRAWINGS

These and other objects and features of the present invention will become apparent from the following description of the preferred embodiments thereof taken in conjunction with the accompanying drawings, in which:

FIG. 3 shows a perspective view of the green sheets in accordance with a production method of the present invention, FIG. 4A is a plan view of a green sheet of an insulating ceramic material in accordance with another embodiment of the present invention, FIG. 4B is a plan view of another green sheet for receiving paste of a material to be thermistor elements.

PREFERRED EMBODIMENT OF THE PRESENT INVENTION

Figure 1:
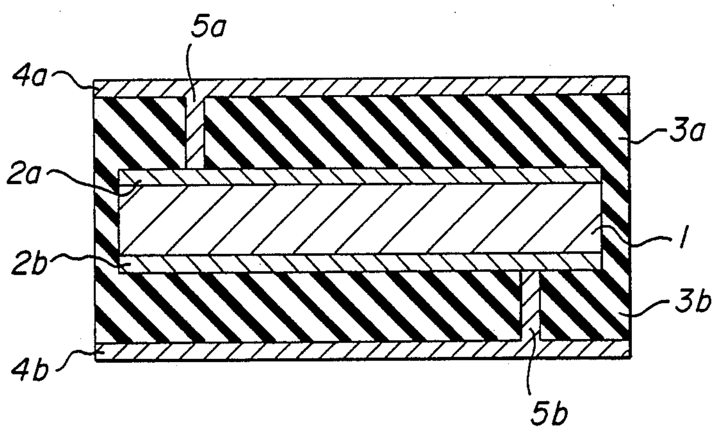
FIG. 1 is a sectional view of a thermistor in accordance with an embodiment of the present invention.

Referring first to FIG. 1, a thermistor element layer 1 made of a material such as SiC is sandwiched by a pair of internal electrodes *2a* and *2b* made of a material having high melting point auch as molybdenum. The sandwich unit of the thermistor element 1 and the internal electrodes *2a* and *2b* is enclosed in an envelope consisting of layers *3a* and *3b* made of an insulative ceramic material such as alumina or zirconia. If firing temperature is not more than 1600° C., insulative nonoxide ceramic materials such as BN, AlN are allowed to be used as envelope material. The envelope is further sandwiched by a pair of external electrodes *4a* and *4b* made of a material such as platinum, where the external electrodes *4a* and *4b* are disposed adjacent the ceramic layers *3a* and *3b* respectively. The external electrodes *4a* and *4b* are electrically connected to the internal electrodes *2a* and *2b* respectively by way of an electrically conductive material filled up in a pair of through holes *5a* and *5b* formed in the ceramic layers *3a* and *3b* respectively. It should be noted here that the material such as molybdenum is used as the internal electrodes because it can be co-fired with the sandwich unit of the thermistor element 1 and the ceramic layers *3a* and *3b*. On the other hand, the external electrodes *4a* and *4b* are allowed to be made of platinum because they are formed through a firing process after sintering the thermistor element layer 1 and the envelope of the ceramic layers *3a* and *3b*.

Figure 2A:
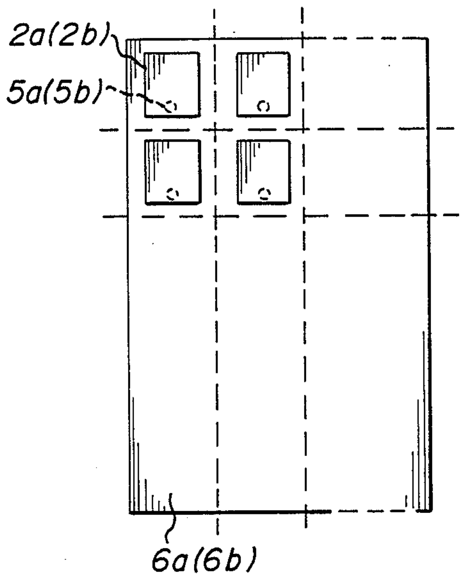
FIG. 2A is a plan view of a green sheet of an insulating ceramic material.

The following describes a method for producing the above-mentioned thermistor. Firstly a slurry is prepared in such a manner that a mixed aqueous solution of organic binder, solvent, plasticizer and dispersant are added to $Al_2O_3$. Secondly a pair of green sheets *6a* and *6b* each having a thickness of 200 μm as shown in FIG. 2A are prepared by the "Doctor-blade" method. Thirdly a certain number of through holes *5a* and *5b* are formed in predetermined positions of the green sheets *6a* and *6b*. And then predetermined areas on one surface of each of the green sheets 6a and 6b are coated with paste of molybdenum 2a and 2b, so that the through holes 5a and 5b are also filled up with the same paste. After this process the green sheets 6a and 6b are dried.

Figure 2B:
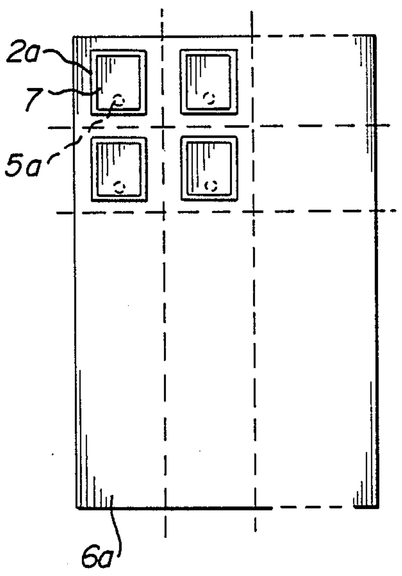
FIG. 2B is a plan view of another green sheet of an insulating ceramic material to be coupled with the green sheet of FIG. 2A.

On the other hand, paste to be thermistor elements is prepared firstly by mixing SiC and $Al_2O_3$ at the ratio of 100:100 and then by adding a mixed aqueous solution of organic binder, solvent, plasticizer and dispersant to the mixture of SiC and $Al_2O_3$. After this process, as shown in FIG. 2B, the sheet 6a is coated with molybdenum paste and then dried to form a thermistor paste layer 7 on each of the predetermined areas. The thus-formed sheet 6a is stacked with the other sheet 6b in such a manner that each area of the layer 2b of molybdenum paste is superposed on the thermistor paste layer 7 as shown in FIG. 3. The stacked body is made up to monolithic structure by applying heat at a temperature of 60° C. under the pressure of 0.5 ton/cm for one minute. With this process, the layers 2a and 2b of molybdenum paste and the thermistor paste layer 7 are totally embedded in an envelope consisting of the green sheets 6a and 6b. The resulting monolithic structure is then cut along predetermined lines to be formed into green units. The green units are fired at a temperature of 1000° C. for one hour in an atmosphere of $H_2$-$N_2$ gas to be firmly bound together, and then further fired at a temperature of 1700° C. in an atmosphere of argon gas. After that the processed thermistor units are coated with platinum paste to be the external electrodes 4a and 4b, and then fired at a temperature of 1100° C. for one hour to be formed into a thermistor. With this process, the thermistor paste layer 7 is sintered to be the thermistor element layer 1, while the green sheets 6a and 6b are sintered to be the ceramic layer 3a and 3b in the form of an envelope. The thus-produced thermistors were proved to have a variance within ±3% of the resistance after being subjected to an environment at a temperature of 800° C. for 1000 Hr and to be chemically stable in a life test.

Although the above describes that the through holes 5a and 5b are formed in the green sheets 6a and 6b prior to stacking the green sheets 6a and 6b, the through holes 5a and 5b may be formed by drilling after stacking the green sheets 6a and 6b interposing the thermistor paste layer.

The internal electrodes may be made of another metal material having high melting point such as tungsten, nickel, platinum or the like. Particularly when a noble metal such as platinum or palladium is selected for the internal electrodes, the internal electrodes can be co-fired with the external electrodes. When the thermistor element is made of a material capable of being sintered at a lower temperature, metal material such as Ag-Pd or copper may be selected for the internal electrodes.

Another embodiment is as follows. Firstly a slurry is prepared in such a manner that a mixed aqueous solution of organic binder, solvent, plasticizer and dispersant are added to $Al_2O_3$. Secondly a pair of green sheets 6a and 6b each having a thickness of 200 μm as shown in FIG. 4A is prepared by the "Doctor-blade" method. Thirdly a certain number of through holes 5a and 5b are formed in predetermined positions of the green sheets 6a and 6b. And then predetermined areas on one surface of each of the green sheets 6a and 6b are coated with paste of molybdenum 2a and 2b, so that the through holes 5a and 5b are also filled up with the same paste. After this process the green sheets 6a and 6b are dried. Another green sheet 8 of a 200 μm thick is prepared in accordance with the same manner as above, and the sheet 8 is formed with openings 8a at predetermined positions of the sheet 8 as shown in FIG. 4B. On the other hand, a slurry is prepared firstly by mixing SiC and $Al_2O_3$ at the ratio of 100:100 and then by adding a mixed aqueous solution of organic binder, solvent, plasticizer and dispersant to the mixture of SiC and $Al_2O_3$. The slurry is then formed into a sheet of 200 μm thick by the "Doctor-blade" method, and then cut into chips 7 of a size just fit into the openings 8a. The chips 7 are then put into the openings 8a of the sheet 8.

Figure 5:
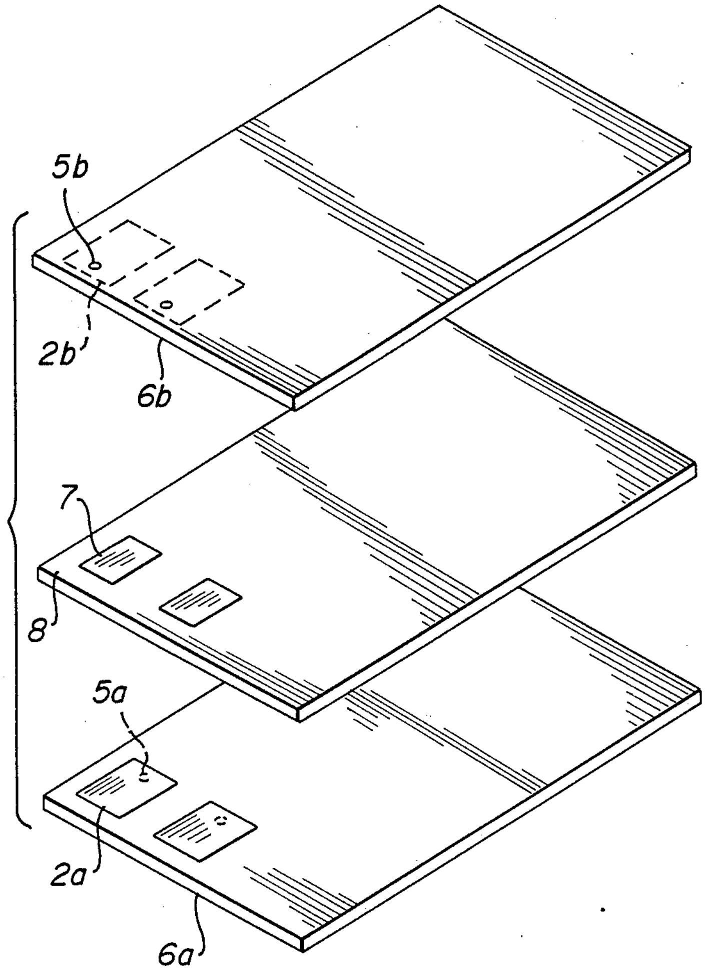
FIG. 5 shows a perspective view of the green sheets in accordance with a production method of the present invention.

Subsequently, the green sheets 6a and 6b are stacked with the sheet 8 in such a manner that the paste layers 2a and 2b of the sheets 6a and 6b are superposed on the chips 7, and then the stacked body undergoes the same processes as mentioned in the description of the previous embodiment to be formed into thermistors, as shown in FIG. 5.

The thus-obtained thermistors are subjected to the same experiment as mentioned hereinbefore to consequently show substantially the same results as in the previous embodiment.

Figure 6:
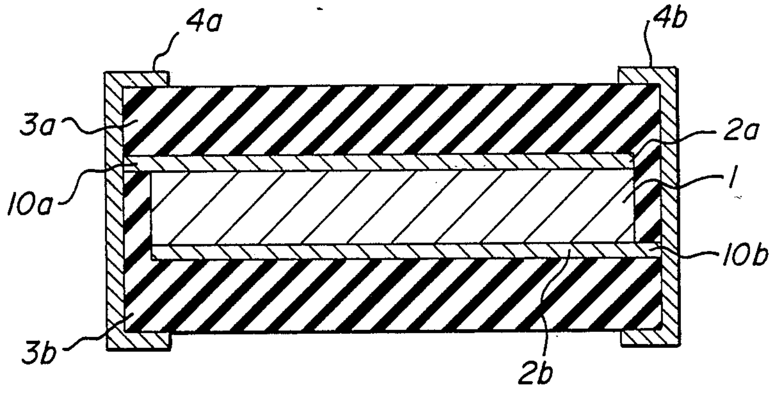
FIG. 6 is a sectional view of a thermistor usable at a higher temperature in accordance with another embodiment of the present invention.

A thermistor in accordance with another embodiment is shown in FIG. 6, where the thermistor has the same monolithic construction as the first embodiment having a thermistor element layer 1 and insulating ceramic layers 3a and 3b forming an envelope. However, the thermistor differs from that of the first embodiment in that the internal electrodes 2a and 2b provided on both sides of the thermistor element layer 2 extend along the interior surface of the insulating ceramic layers 3a and 3b having such a relation that opposite ends of the internal electrodes 2a and 2b extend in the opposite direction to be electrically connected to corresponding external electrodes 4a and 4b. In FIG. 6 the internal electrodes 2a and 2b have respective end portions designated at 10a and 10b.

The above construction capacitates the electrical connection between the internal electrodes and the external electrodes without forming the through holes as mentioned in the discussion of the first embodiment. It should be noted here that the materials of the thermistor element layer and the insulating ceramic layers are the same as in the first embodiment. On the other hand, the internal electrodes are made of platinum being the same material as that of the external electrodes. Of course this material may be any of the metals having high melting points such as molybdenum, tungsten, nickel or the like.

Figure 7A:
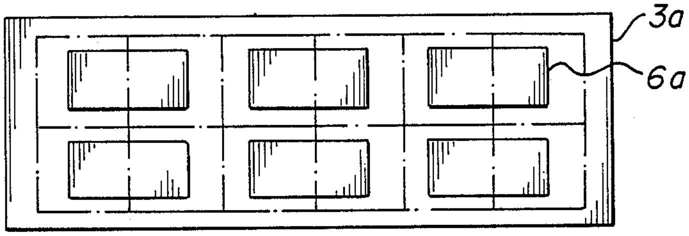
FIGS. 7A, 7B and 7C are plan views of green sheets of an insulating ceramic material for producing the thermistor of FIG. 6, and FIG. 8 and FIG. 9 are sectional views of a thermistor in accordance with another embodiment of the present invention.
Figure 7B:
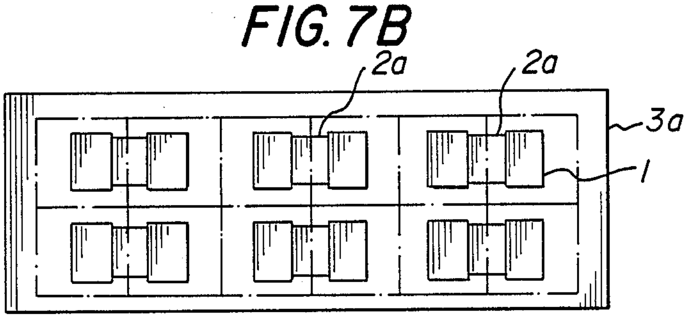
Figure 7C:
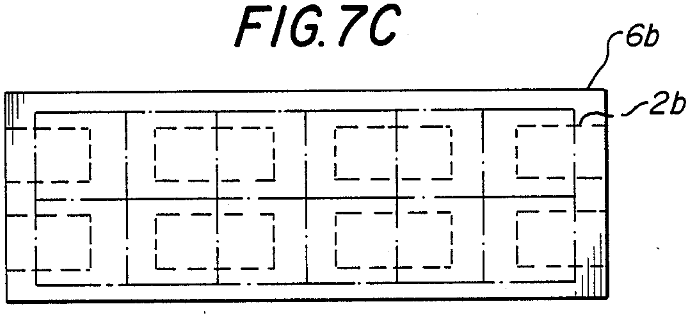

The following describes a method for producing the above thermistor with reference to FIG. 7. Firstly a green sheet of an insulating ceramic material is formed, and then cut into a sheet of a size as shown in FIG. 7A. One surface of the sheet is coated with platinum paste to be first internal electrodes 2a bridging adjacent segments each of which is to be formed into independent thermistor units as shown in FIG. 7A, and further coated with paste to be thermistor elements 1 as shown in FIG. 7B to be subsequently dried. The sheet is stacked with another sheet 7 provided with the same coating layer of platinum to be second internal electrodes 2b on the rear surface thereof. Then the sheets 7 are stacked and then cut in accordance with predetermined cut lines as shown by chain lined in FIG. 7C to be subsequently cut into thermistor units. Each of the thermistor units are then coated with platinum paste to be external electrodes and dried to be formed into thermistor units having a construction as shown in section in FIG. 6. The resulting thermistor unit is fired at a temperature from 1500° C. to 1650° C. for two hours to be sintered into monolithic thermistor.

Figure 8:
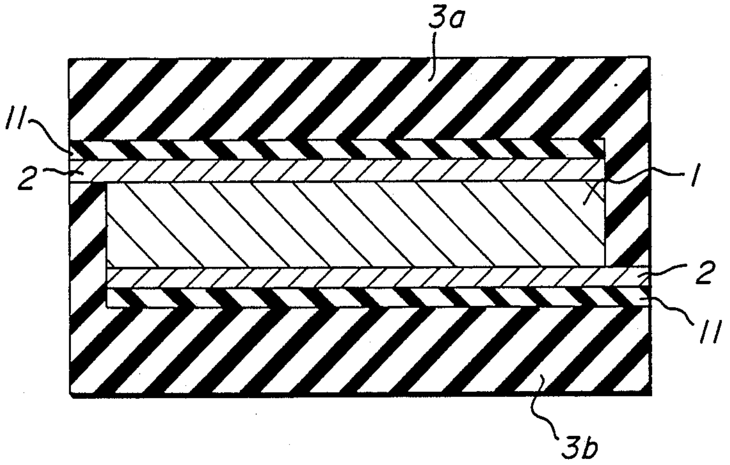

Describing then to a thermistor in accordance with another embodiment with reference to FIG. 8, in which the thermistor has the same monolithic construction consisting of the thermistor element layer 1 and the insulating ceramic layers 3*a* and 3*b* as those of the embodiments mentioned before. The thermistor of this embodiment differs from the foregoing embodiments in that the thermistor of this embodiment includes a pair of diffusion preventing layers 11 between the insulating ceramic layers 3*a* and 3*b* and the thermistor element layer 1.

The diffusion preventing layers 11 are made of ceramic material such as $Y_2O_3$-$ZrO_2$-$Al_2O_3$ system. The diffusion preventing layers 11 operate to effectively prevent diffusion of the ingredients contained in the thermistor element layer 1 and the insulating ceramic layers 3*a* and 3*b* toward each other in the process of firing the same.

The thermistor of the above construction is produced as follows. Firstly a green sheet of an insulating ceramic material of $Al_2O_3$ system is prepared. Then predetermined areas on one surface of the green sheet is coated with paste of a material of $Y_2O_3$-$ZrO_2$-$Al_2O_3$ system mixed with a aqueous solution of organic binder, solvent, plasticizer and dispersant. After that said surfaces of the green sheets are coated with platinum paste to be internal electrodes. Then said surfaces are further coated with paste to be the thermistor element layer 1.

On the other hand, another green sheet of the same material of $Al_2O_3$ system is formed and coated with paste to be the diffusion preventing layers on predetermined areas of one surface thereof. Then the predetermined areas of the green sheet is coated with platinum paste to be other internal electrodes. The green sheet is stacked with the above green sheet and is made up to a monolithic structure by applying heat and pressure. In this place, one of the green sheets is disposed laterally so that the opposite ends of the internal electrodes extend in the opposite directions to be electrically connected to corresponding external electrodes.

The resulting sandwich sheet of the green sheets is cut into individual thermistor units, and then fired at a temperature of approximately 1550° C. for two hours.

The thus-obtained thermistor shows smaller variance of the resistance and the thermistor constant because the diffusion preventing layers effectively prevent diffusion of the ingredients contained in the thermistor element layer and the insulating ceramic layer toward each other. This enables the production of thermistors having a good quality in stability, as well as the standardization of the characteristics of the thermistors, which results in higher yield rate of the thermistors.

Although the above describes that the paste of the material of $Y_2O_3$-$ZrO_2$-$Al_2O_3$ system is selected for the diffusion preventing layers, another equivalent material capable of operating as the diffusion preventing layers may be selected instead.

Figure 9:
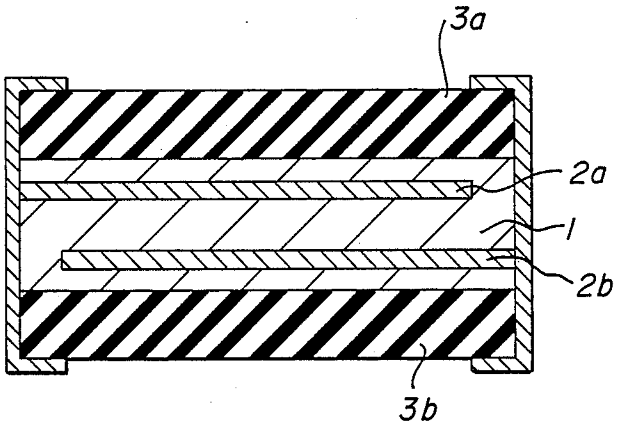

A thermistor in accordance with another embodiment is shown in FIG. 9. This thermistor has the same construction as that of the second embodiment only having a difference in that the internal electrodes 2*a* and 2*b* are embedded in the thermistor element layer 1 and the thermistor element layer 1 is arranged to be extended to the edge thereof. According to this construction, the thermistor having a stability in the resistance value and the thermistor constant can be obtained without influence of the firing temperature. It should be noted here that each thermistor layers shown in FIGS. 1, 6 and 8 may be extended to the edge of the sintered body. And the thermistor element layer in each of the embodiments may be either single or plural in number.

What is claimed is:

1. A method of producing negative temperature coefficient thermistor units, wherein each thermistor unit comprises a thermistor element enclosed in an envelope of insulating ceramic material, internal electrodes, and external electrodes, comprising the steps of:

(a) forming a pair of green sheets wherein each green sheet comprises said insulating ceramic material;

(b) coating predetermined areas of the surfaces of said green sheets with paste to be formed into internal electrodes for said thermistor units;

(c) stacking said green sheets, interposing therebetween in predetermined areas a non-continuous layer of paste for thermistor elements for said thermistor units;

(d) cutting said stacked green sheets into individual thermistor units in such a manner that the cuts do not go through the paste for the thermistor elements;

(e) co-firing each obtained thermistor unit so as to form a sintered body, wherein the thermistor element in each thermistor unit is enclosed in an envelope of sintered insulating ceramic material; and (f) forming a pair of external electrodes on the surfaces of each thermistor unit.

2. A method according to claim 1, wherein the step of forming said pair of green sheets further comprises the step of forming for each thermistor unit a pair of through holes, each of which is filled with the same electrically conductive material as that of the external electrodes.

3. A method according to claim 1, wherein the step of stacking said green sheets interposing therebetween a layer of paste for thermistor elements further comprises the step of forming for each thermistor unit a pair of through holes, each of which is filled with the same electrically conductive material as that of the external electrode.

4. A method of producing negative temperature coefficient thermistor units, wherein each thermistor unit comprises a thermistor element enclosed in an envelope of insulating ceramic material, internal electrodes, and external electrodes, comprising the steps of:

(a) forming a pair of first green sheets of said insulating ceramic material;

(b) coating predetermined areas of the surfaces of said first green sheets with paste to be formed into external electrodes;

(c) preparing a second green sheet made of the same material as said first green sheets and formed with a number of openings arranged at predetermined positions thereof;

(d) filling up each of said openings with paste for thermistor elements;

(e) stacking said first green sheet interposing therebetween said second green sheet;

(f) cutting said stacked sheets into individual thermistor units in such a manner that the cuts do not go through the paste for the thermistor elements;

(g) co-firing each obtained thermistor unit as to form a sintered body wherein the thermistor element in each thermistor unit is enclosed in an envelope of sintered insulating ceramic material; and (h) forming a pair of external electrodes on each thermistor unit.

5. A method of producing negative temperature coefficient thermistor units, wherein each thermistor unit comprises a thermistor element enclosed in an envelope of insulating ceramic material, internal electrodes, and external electrodes, comprising the steps of:

(a) forming a pair of green sheets wherein each green sheet comprises said insulating ceramic material;

(b) coating predetermined areas of the surfaces of said green sheets with paste to be formed into diffusion preventing layers;

(c) providing over said paste for the diffusion preventing layers a coating of a paste to be formed into internal electrodes;

(d) stacking said green sheets, interposing therebetween in predetermined areas a non-continuous layer of paste for thermistor elements for said thermistor units;

(e) cutting said stacked green sheets into individual thermistor units in such a manner that the cuts do not go through the paste for the thermistor elements;

(f) firing said thermistor unit so as to form a sintered body, wherein the thermistor element in each thermistor unit is enclosed in an envelope of sintered ceramic material.

6. A method according to claim 5, wherein each diffusion preventing layer comprises a powdered material of the $Y_2O_3$-$ZrO_2$-$Al_2O_3$ system.

7. A method of producing negative temperature coefficient thermistor units, wherein each thermistor unit comprises a thermistor element sandwiched between two layers of insulating ceramic material, internal electrodes, and external electrodes, comprising the steps of:

(a) forming a pair of green sheets wherein each green sheet comprises said insulating ceramic material;

(b) coating predetermined areas of the surfaces of said green sheets with paste to be formed into internal electrodes in such a manner that the area of one green sheet extends to the position corresponding to one side of the thermistor unit and the area of the other green sheet extends to the position corresponding to the other side of the thermistor unit;

(c) stacking said green sheets, interposing therebetween in predetermined areas a layer of paste for thermistor elements for said thermistor units;

(d) cutting said stacked green sheets into individual thermistor units;

(e) coating both ends of each of said thermistor units with paste for external electrodes; and (f) firing said thermistor unit so as to form a sintered body, wherein the thermistor element in each thermistor unit is sandwiched between two layers of sintered ceramic material.

* * * * *